(12) United States Patent
Slattery

(10) Patent No.: US 12,214,547 B2
(45) Date of Patent: Feb. 4, 2025

(54) ADDITIVE-MANUFACTURING SYSTEMS AND METHODS

(71) Applicant: THE BOEING COMPANY, Chicago, IL (US)

(72) Inventor: Kevin T. Slattery, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 899 days.

(21) Appl. No.: 16/035,795

(22) Filed: Jul. 16, 2018

(65) Prior Publication Data

US 2020/0016831 A1 Jan. 16, 2020

(51) Int. Cl.

| | |
|---|---|
| *B29C 64/153* | (2017.01) |
| *B22F 3/24* | (2006.01) |
| *B22F 10/28* | (2021.01) |
| *B22F 10/50* | (2021.01) |
| *B22F 10/80* | (2021.01) |

(Continued)

(52) U.S. Cl.
CPC .............. *B29C 64/153* (2017.08); *B22F 3/24* (2013.01); *B22F 10/28* (2021.01); *B22F 10/50* (2021.01); *B22F 10/80* (2021.01); *B22F 12/222* (2021.01); *B22F 12/45* (2021.01); *B29C 64/188* (2017.08); *B29C 64/209* (2017.08); *B29C 64/268* (2017.08); *B22F 2003/247* (2013.01);

(Continued)

(58) Field of Classification Search
CPC ... B29C 64/188; B29C 64/153; B29C 64/209; B29C 64/268; B29C 64/393; B29C 41/08; B22F 3/1055; B22F 3/24; B22F 2003/1057; B22F 2003/247; B33Y 10/00; B33Y 30/00

See application file for complete search history.

(56) References Cited

U.S. PATENT DOCUMENTS 9,254,535 B2 * 2/2016 Buller .................. B23K 10/006
9,456,884 B2 * 10/2016 Uckelmann ............ B33Y 30/00
(Continued)

FOREIGN PATENT DOCUMENTS

| CN | 108136669 | 6/2018 |
|---|---|---|
| EP | 1316408 | 6/2003 |

(Continued)

OTHER PUBLICATIONS

European Search Report for EP 19181287.4-109, dated Dec. 3, 2019.

(Continued)

*Primary Examiner* — Alison L Hindenlang
*Assistant Examiner* — Shibin Liang
(74) *Attorney, Agent, or Firm* — Joseph M. Butscher; The Small Patent Law Group, LLC

(57) ABSTRACT

An additive manufacturing system and method includes a powder bed, an additive manufacturing head that is configured to emit a first energy into the powder bed to form at least one layer of a component, a part exposing mechanism that is configured to operate so that the component is in a first position at a first time within the powder bed, and a second position at a second time in which a portion of the component is exposed outside of the powder bed, and a surface smoothing head that is configured to emit a second energy onto the portion of the component in the second position to smooth the portion of the component.

18 Claims, 6 Drawing Sheets

(51) Int. Cl.
*B22F 12/00* (2021.01)
*B22F 12/45* (2021.01)
*B29C 64/188* (2017.01)
*B29C 64/209* (2017.01)
*B29C 64/268* (2017.01)
*B22F 10/73* (2021.01)
*B29C 64/393* (2017.01)
*B33Y 10/00* (2015.01)
*B33Y 30/00* (2015.01)

(52) U.S. Cl.
CPC ............. *B22F 10/73* (2021.01); *B29C 64/393* (2017.08); *B33Y 10/00* (2014.12); *B33Y 30/00* (2014.12)

(56) References Cited

U.S. PATENT DOCUMENTS

| | | | |
|---|---|---|---|
| 9,751,260 | B2 | 9/2017 | Dietrich |
| 9,833,955 | B2 | 12/2017 | Exone |
| 2001/0045678 | A1* | 11/2001 | Kubo .................... B29C 64/35 425/375 |
| 2015/0048553 | A1 | 2/2015 | Dietrich |
| 2017/0252860 | A1* | 9/2017 | Bamberg ............... B23K 20/10 |
| 2018/0126634 | A1* | 5/2018 | Buerger ................ B22F 3/1055 |
| 2018/0253080 | A1* | 9/2018 | Meess ................ G05B 19/4099 |

FOREIGN PATENT DOCUMENTS

| | | |
|---|---|---|
| JP | 2000-73108 | 3/2000 |
| JP | 2002-38201 | 2/2002 |
| JP | 2015-189024 | 11/2015 |
| WO | WO 2017044892 | 3/2017 |

OTHER PUBLICATIONS

Notice of Reasons for Rejection for JP App. No. 2019-130794, dated May 2, 2023 (and English Translation).
Machine translation of JP 2002-38201.
Machine translation of JP 2000-73108.
Requisition for Canadian App. No. 3,046,734, dated Oct. 6, 2022.
Notice of Reasons for Refusal for JP App. No. 2019-130794, dated Sep. 22, 2023 (and English translation).
Requisition for CA 3,046,734, dated Jul. 7, 2023.

* cited by examiner

ADDITIVE-MANUFACTURING SYSTEMS AND METHODS

FIELD OF THE DISCLOSURE

Embodiments of the present disclosure generally relate to additive-manufacturing systems and methods, and more particularly, to systems and methods of smoothing powder bed fusion additively-manufactured components.

BACKGROUND OF THE DISCLOSURE

Additive manufacturing systems and methods are used to fabricate components (such as parts or products) through multiple layers of material. For example, known additive manufacturing systems and methods form a component by adding layer-upon-layer of material. Additive manufacturing systems and methods may include or otherwise use three dimensional (3D) modeling (for example, computer-aided design or CAD) software, computer-controlled additive-manufacturing equipment, and raw materials in powder or liquid form.

Additive manufacturing encompasses a wide variety of technologies and incorporates a wide variety of techniques, such as, for example, laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi jet modeling (MJM), 3D printing, rapid prototyping, direct digital manufacturing, layered manufacturing, and additive fabrication. Moreover, a variety of raw materials may be used in additive manufacturing to create products. Examples of such materials include plastics, metals, concrete, and glass.

One example of an additive-manufacturing system is a laser additive-manufacturing system. Laser additive manufacturing includes spraying or otherwise injecting a powder or a liquid into a focused beam of a high-power laser or nexus of a plurality of high-powered lasers under controlled atmospheric conditions, thereby creating a weld pool. The resulting deposits may then be used to build or repair articles for a wide variety of applications. The powder injected into the high-power laser beam may include a wide variety of materials such as metal, plastic, and/or the like.

Articles formed by additive manufacturing may require surface processing to provide a more desirable product. One example of surface processing includes smoothing or otherwise reducing the roughness of the product's surface. Surfaces produced by known additive manufacturing systems and methods may have rough surface finishes, for example, on the order of about 600-1000 microinches $R_a$. Such rough surfaces may have several undesirable effects. For example, components having a rough surface finish have limited applications in cyclical-loading environments due to stress risers typically associated with high surface roughness. Additionally, rough surfaces may impede the use of cost-saving, non-destructive inspection systems because rough surface finishes generate high levels of noise in such systems. When used on parts having relatively smooth surfaces, non-destructive inspection methods are widely recognized as cost-effective and accurate tools for identifying structural deficiencies in such parts.

To improve the surface finish of a component fabricated with additive-manufacturing equipment, separate post-processing steps are typically undertaken at a processing location using conventional surface-finishing equipment and techniques. However, due to the complexity of some parts, post-processing of surfaces may be cumbersome, expensive, and time consuming. In addition, conventional post-processing surface-finishing methods may be ineffective for reducing the surface roughness of the interior surfaces of some complex parts, resulting in products with less than desirable properties.

Certain additive manufacturing methods include forming a component with a powder bed of material, such as metal, plastic, and/or the like. Typically, the component is formed within the powder bed. As such, certain known systems and methods of smoothing are unable to be used, as the surrounding material of the powder bed blocks an operative field of a surface processing device. That is, the smoothing laser is unable to emit energy onto a portion to be smoothed, as the portion of the component is embedded or otherwise covered by the powder bed.

SUMMARY OF THE DISCLOSURE

A need exists for an additive manufacturing system and method that allow for efficient smoothing of portions of a component. Further, a need exists for an additive manufacturing system and method that is configured to expose at least a portion of component to be smoothed.

With those needs in mind, certain embodiments of the present disclosure provide an additive manufacturing system that includes a powder bed, an additive manufacturing head that is configured to emit a first energy into the powder bed to form at least one layer of a component, a part exposing mechanism that is configured to operate so that the component is in a first position at a first time within the powder bed, and a second position at a second time in which a portion of the component is exposed outside of the powder bed, and a surface smoothing head that is configured to emit a second energy onto the portion of the component in the second position to smooth the portion of the component.

In at least one embodiment, a container defining a forming chamber. The part exposing mechanism may be on or within the container.

The additive manufacturing head may be fixed in position. Optionally, the additive manufacturing head may be moveable. In at least one embodiment, the additive manufacturing head is configured to emit the first energy as one or more laser beams.

The surface smoothing head may be fixed in position. Optionally, the surface smoothing head may be moveable. In at least one embodiment, the surface smoothing head is configured to emit the second energy as one or more laser beams.

The first energy and the second energy may be the same type of energy (such as laser beams). Alternatively, the first energy may be a different type of energy than the second energy.

The surface smoothing head may be coupled to the additive manufacturing head. In at least one embodiment, the surface smoothing head may be moveably coupled to the additive manufacturing head.

A forming control unit may be in communication with the additive manufacturing head, the part exposing mechanism, and the surface smoothing head. The forming control unit may be configured to control the additive manufacturing head, the part exposing mechanism, and the surface smoothing head.

In at least one embodiment, the part exposing mechanism includes an actuation assembly that is configured to move the component upwardly into the second position so that the portion of the component extends upwardly past a top surface of the powder bed. The actuation assembly may include a forming bed that supports the component, and an actuator operatively coupled to the forming bed. The actuation assembly may also include a motor operatively coupled to the actuator.

In at least one embodiment, the part exposing mechanism includes a drain assembly that is configured to be selectively moved between a closed position and an open position. At least a first portion of powder drains through the drain assembly in the open position to expose the portion of the component in the second position. The drain assembly may include a moveable cover proximate to an outlet formed through a container that retains the powder bed. The moveable cover closes the outlet in the closed position, and moves away from the outlet to open the outlet in the open position. At least some of the powder bed drains out of the outlet when the moveable cover is in the open position.

Certain embodiments of the present disclosure provide an additive manufacturing method that includes emitting a first energy from an additive manufacturing head into a powder bed to form at least one layer of a component, operating a part exposing mechanism so that the component is in a first position at a first time within the powder bed, and a second position at a second time in which a portion of the component is exposed outside of the powder bed, and emitting a second energy from a surface smoothing head onto the portion of the component in the second position to smooth the portion of the component.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide an additive manufacturing system and method that includes a part exposing mechanism that is configured to expose a portion of a component formed within a powder bed through additive manufacturing. In at least one embodiment, the part exposing mechanism includes an actuation assembly that moves at least a portion of the component out of the powder bed after an additive manufacturing head forms at least one layer of the component. In at least one other embodiment, the part exposing mechanism includes a drain assembly that is configured to drain at least a portion of the powder bed out of a forming chamber, thereby exposing at least a portion of the component. When the portion(s) of the component is exposed above a surface of the powder bed, a surface processing head is operated to smooth the portion(s), such as by melting rough surfaces of the portion(s).

Certain embodiments of the present disclosure provide an additive-manufacturing system that includes an additive manufacturing head (such as a device for selective laser sintering of a new layer of material on an existing layer of material), and a surface-processing head, which may be coupled to the additive manufacturing head for selective laser sintering. The surface-processing device includes a laser-emitting device configured to emit a laser beam that smooths an adjacent surface of at least one of the new layer of material and the existing layer of material.

Certain embodiments of the present disclosure provide a method of additively manufacturing a component. The method includes melting a first layer of powder to generate a build portion and metallic powder, separating the build portion from the unused powder, emitting a laser beam (such as energy emitted from a laser-emitting device) to smooth the build portion and thereby generate a smoothed build portion, positioning the smoothed build portion within the unused powder, and sintering a second layer of metallic powder onto the smoothed build portion.

Figure 1:
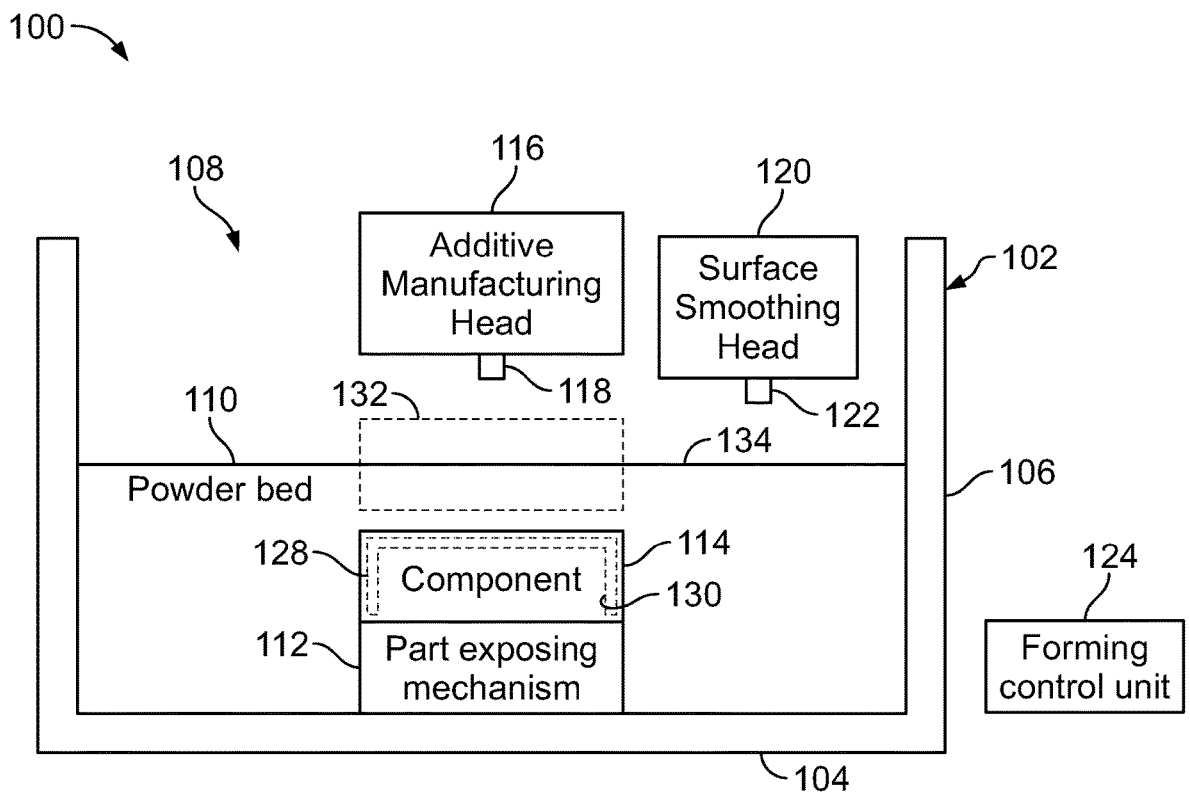
FIG. 1 illustrates a schematic diagram of an additive manufacturing system, according to an embodiment of the present disclosure.

FIG. 1 illustrates a schematic diagram of an additive manufacturing system 100, according to an embodiment of the present disclosure. The additive manufacturing system 100 includes a container 102 that includes a base 104 and walls 106 upstanding from the base 104. The base 104 and the walls 106 define a forming chamber 108. The forming chamber 108 retains a powder bed 110, such as formed of metal, polymer, or other such material.

A part exposing mechanism 112 is positioned on and/or within the container 102, such as within the forming chamber 108. The part exposing mechanism 112 provides a powder bed management system that is configured to expose at least a portion of a component 114 during an additive manufacturing process that forms one or more layers of the component 114.

An additive manufacturing head 116 is fixed in position or moveable in relation to the forming chamber 108. The additive manufacturing head 116 includes an energy emitter 118. In at least one embodiment, the additive manufacturing head 116 is a laser scanner that emits one or more laser beams through the energy emitter 118, which may be a laser output, array, and/or the like. Optionally, the additive manufacturing head 116 may be an electron beam scanner that emits one or more electron beams through the energy emitter 118, which may be an electron beam output, array, and/or the like. As another example, the additive manufacturing head 116 may be an arcing scanner that emits electrical arcing energy through the energy emitter 118, which may be an arcing output, array, and/or the like. U.S. Pat. No. 9,751,260, entitled "Additive Manufacturing Systems, Apparatuses, and Methods" (the "260 Patent") discloses examples of an additive manufacturing head. The 260 Patent is hereby incorporated by reference in its entirety.

The additive manufacturing head 116 is configured to emit energy, such as one or more laser beams, into the powder bed 110 to form layers of the component 114. For example, the additive manufacturing head 116 is configured to selectively laser sinter layers of material of the powder bed 110 onto an existing layer of material to form the component 114.

A surface smoothing head 120 is fixed in position or moveable in relation to the forming chamber 108. The surface smoothing head 120 provides a glazing device that is configured to smooth portions of the component 114 after one or more layers of the component 114 are formed by operation of the additive manufacturing head 116. The surface smoothing head 120 includes an energy emitter 122. The surface smoothing head 120 may be configured to emit the same type of energy as the additive manufacturing head 116. For example, the additive manufacturing head 116 may be configured to emit a first energy into the powder bed 110 to form a layer of the component 114, while the surface smoothing head 120 is configured to emit a second energy onto an exposed portion of the component 114 to smooth the exposed portion. The first energy and the second energy may be the same type of energy. In at least one other embodiment, the first energy and the second energy may be different types of energy. For example, the first energy may be a laser beam, while the second energy may be an electron beam.

In at least one embodiment, the surface smoothing head 120 is a laser emitter that emits one or more laser beams through the energy emitter 122. Optionally, the surface smoothing head 120 may be an electron beam scanner that emits one or more electron beams through the energy emitter 122. As another example, the surface smoothing head 120 may be configured to emit electrical arcing energy through the energy emitter 122. In at least one embodiment, the surface smoothing head 120 may be the same as or similar to the surface processing devices described in the 260 Patent.

The additive manufacturing head 116 may be coupled to the surface smoothing head 120. For example, the surface smoothing head 120 may be moveably coupled to the additive manufacturing head 116, such as through an articulating arm(s), carriage, gantry, tracks, brackets, and/or the like. In at least one other embodiment, the surface smoothing head 120 is not directly coupled to the additive manufacturing head 116.

In at least one embodiment, the additive manufacturing system 100 includes a forming control unit 124, which may be configured to control (for example, operate) the additive manufacturing system 100. The forming control unit 124 may be in communication with the part exposing mechanism 112, the additive manufacturing head 116, and the surface smoothing head 120, such as through one or more wired or wireless connections. The forming control unit 124 may be configured to operate the additive manufacturing system 100 through preprogrammed instructions stored in memory.

In operation, the additive manufacturing head 116 emits energy (such as one or more laser beams) into the powder bed 110 to form a layer 128 of the component 114. For example, the additive manufacturing head 116 selectively laser sinters the layer 128 from material within the powder bed 110 onto an existing layer 130 of the component 114. The forming control unit 124 may control the additive manufacturing head 116 during the forming process.

After the layer 128 of the component 114 has been formed by the additive manufacturing head 116 emitting energy into the powder bed 110, the part exposing mechanism 112 is operated to expose at least a portion 132 of the component 114 out of the powder bed 110. The portion 132 may be an edge of the component 114. The portion 132 may be half or more of the component 114. In at least one other embodiment, the portion 132 may be an entirety of the component. In at least one embodiment, the forming control unit 124 operates the part exposing mechanism 112 to expose the portion(s) 132 of the component 114 out of the powder bed 110. The portion(s) 132 may be the layer 128 (or at least a portion thereof) that was previously formed by the additive manufacturing head 116 emitting energy into the powder bed 110.

After the portion(s) 132 is exposed outside of the powder bed 110, the surface smoothing head 120 may be operated to melt rough surface portions of the portion(s) 132, which may include portions of the layer 128, the existing layer 130, and/or various other portions of the component 114. For example, the forming control unit 124 may control operation of the surface smoothing head 120 to emit energy (such as a laser beam) to smooth the portion(s) 132 outside of the powder bed 110. After the portion(s) 132 has been smoothed by the surface smoothing head 120, the part exposing mechanism 112 is operated to move the component 114 back into the powder bed 110 so that the component 114 is submerged therein or otherwise covered thereby. In at least one embodiment, additional material may be added to the powder bed 110 to submerge the component 114 therein. When the component 114 is submerged within or otherwise covered by the powder bed 110, the process may repeat, such that the additive manufacturing head 116 emits energy into the powder bed 110 to form another layer over the layer 128, after which the part exposing mechanism 112 is operated to expose at least a portion of the component 114 to be smoothed by the surface smoothing head 120. The process continues to repeat until all layers of the component 114 are formed, and all portions that are to be smoothed by the surface smoothing head 120 are smoothed.

As described, embodiments of the present disclosure provide the additive manufacturing system 100 that includes the powder bed 110, the additive manufacturing head 116 that is configured to emit a first energy (such as one or more laser beams) into the powder bed 110 to form at least one layer 128 of the component 114, the part exposing mechanism 112 that is configured to operate so that the component 114 is in a first position (such as a covered or submerged position) at a first time within the powder bed 110, and a second position at a second time (such as after the first time) in which the portion 132 of the component 114 is exposed outside of the powder bed 110, and the surface smoothing head 120 that is configured to emit a second energy (such as one or more laser beams) onto the portion 132 of the component 114 in the second position to smooth the portion 132 of the component 114.

In at least one embodiment, the part exposing mechanism 112 is or otherwise includes an actuation assembly that moves the component 114 upwardly within the forming chamber 108 such that the portion(s) 132 is exposed above a top surface 134 of the powder bed 110. In at least one other embodiment, the part exposing mechanism 112 is or otherwise includes a drain assembly that is configured to be selectively closed and opened. In the open position, a portion of the powder bed 110 drains out of the forming chamber 108, until the portion 132 is exposed above the top surface 134.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the forming control unit 124 may be or include one or more processors that are configured to control operation of the additive manufacturing system 100, as described herein.

The forming control unit 124 is configured to execute a set of instructions that are stored in one or more data storage units or elements (such as one or more memories), in order to process data. For example, the forming control unit 124 may include or be coupled to one or more memories. The data storage units may also store data or other information as desired or needed. The data storage units may be in the form of an information source or a physical memory element within a processing machine.

The set of instructions may include various commands that instruct the forming control unit 124 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the forming control unit 124. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the forming control unit 124 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
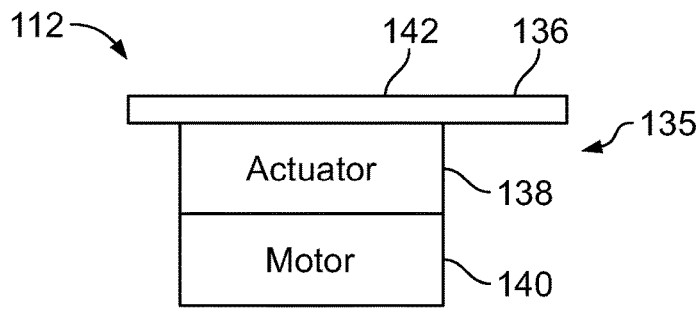
FIG. 2 illustrates a schematic diagram of a part exposing mechanism, according to an embodiment of the present disclosure.

FIG. 2 illustrates a schematic diagram of the part exposing mechanism 112, according to an embodiment of the present disclosure. In this embodiment, the part exposing mechanism 112 is an actuation assembly 135 that includes a forming bed 136 and an actuator 138 operatively coupled to the forming bed 136. A motor 140 is operatively coupled to the actuator 138.

Referring to FIGS. 1 and 2, the component 114 is supported on a top surface 142 of the forming bed 136. The actuator 138 may be or include one or more electric, pneumatic, hydraulic, and/or the like pistons, cams, lift brackets, and/or the like that are moved by the motor 140. The motor 140 is activated to move the actuator 138 and selectively lift and lower the forming bed 136, and therefore the component 114, upwardly and downwardly in relation to the powder bed 110. Optionally, the actuator 138 may include an integral motor or other form of powered actuation, instead of being coupled to a separate and distinct motor. The forming control unit 124 may be in communication with the motor 140, such as through one or more wired or wireless connections, to control operation of the part exposing mechanism 112. In at least one other embodiment, the actuation assembly may include a vibratory device or the like that is configured to shake power bed material off the component 114.

Figure 3:
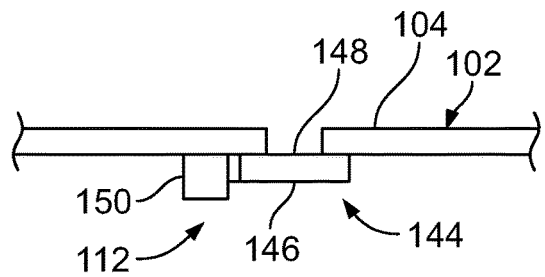
FIG. 3 illustrates a schematic diagram of a part exposing mechanism, according to an embodiment of the present disclosure.

FIG. 3 illustrates a schematic diagram of the part exposing mechanism 112, according to an embodiment of the present disclosure. In this embodiment, the part exposing mechanism 112 is a drain assembly 144 coupled to a portion of the container 102. For example, the drain assembly 144 may be secured to the base 104 of the container 102. In at least one other embodiment, the drain assembly 144 may be secured to a wall 106 (shown in FIG. 1) of the container 102 below the top surface 134 of the powder bed 110.

The drain assembly 144 includes a moveable cover 146 proximate to an outlet 148 (such as an opening) formed through the container 102. The cover 146 is moveably coupled to an actuator 150 (such as a moveable hinge, post, or the like). In a closed position, the cover 146 closes the outlet 148. For example, in the closed position, the cover 146 may be positioned below, over, or within the outlet 148 to prevent material from draining out of the outlet 148. In an open position, the actuator 150 moves the cover 146 away from the outlet 148, thereby allowing material to drain out of the outlet 148. The forming control unit 124 may be in communication with the actuator 150, such as through one or more wired or wireless connections, to control operation of the part exposing mechanism 112.

Figure 4:
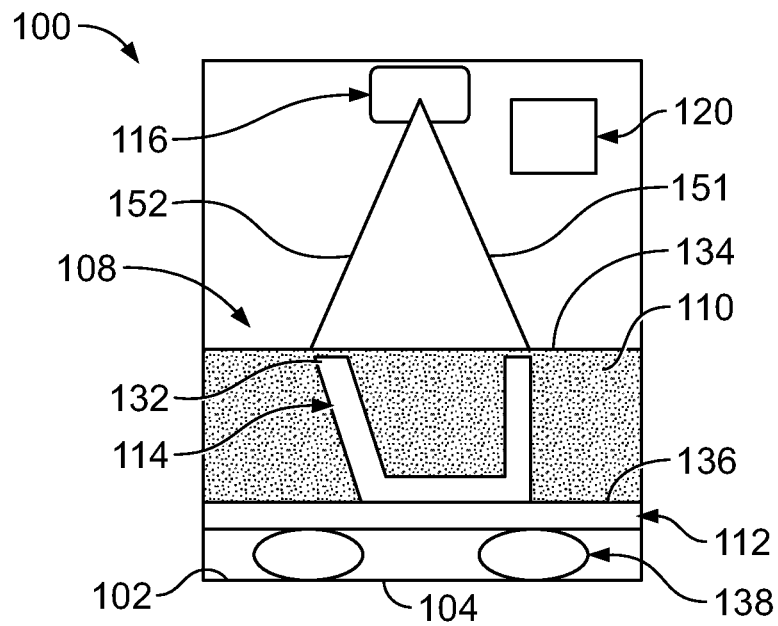
FIG. 4 illustrates a schematic diagram of an additive manufacturing system in a layer forming state, according to an embodiment of the present disclosure.

FIG. 4 illustrates a schematic diagram of the additive manufacturing system 100 in a layer forming state, according to an embodiment of the present disclosure. As shown, the component 114 is supported on the forming bed 136 (such as a plate) within the forming chamber 108. In the layer forming state, the part exposing mechanism 112 is in a first position, in which the actuators 138 are retracted. In the layer forming state, the component 114 is submerged within or otherwise covered by the powder bed 110. No portion of the component 114 may be exposed above the top surface 134 during the layer forming stage.

During the layer forming state, the additive manufacturing head 116 emits energy 151 (such as one or more laser beams) into the powder bed 110 to form a layer of the component 114, as described herein. The surface smoothing head 120 is outside of an energy emission envelope 152 of the additive manufacturing head 116 during the layer forming state. After a desired layer of the component 114 has been formed by the additive manufacturing head 116 emitting the energy 151 into the powder bed 110, the part exposing mechanism 112 is operated to move the portion 132 of the component 114 above the top surface 134 of the powder bed 110.

Figure 5:
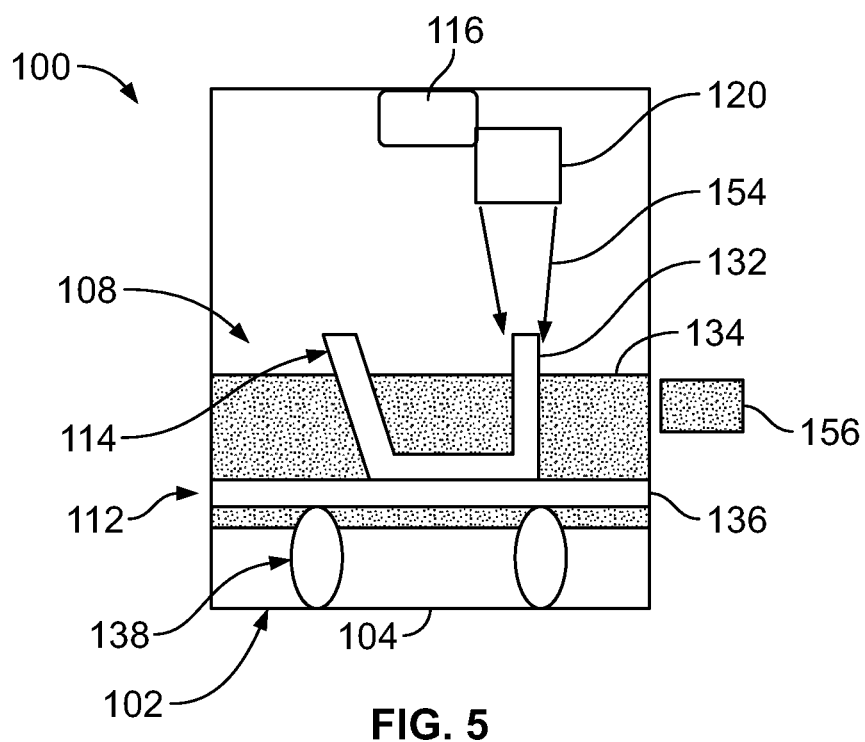
FIG. 5 illustrates a schematic diagram of an additive manufacturing system in a component smoothing state, according to an embodiment of the present disclosure.

FIG. 5 illustrates a schematic diagram of the additive manufacturing system 100 in a component smoothing state, according to an embodiment of the present disclosure. As shown, in the component smoothing state, the part exposing mechanism 112 is in a second position, in which the actuators 138 are extended to move the component 114 upwardly through the powder bed 110. In the component smoothing state, the additive manufacturing head 116 is deactivated, and the actuators 138 are moved to urge the portion(s) 132 above the top surface 134 of the powder bed 110. As such, the surface smoothing head 120 may then be moved into a desired position to emit focused energy 154 (such as a focused laser beam) onto the portion(s) 132 of the component 114 to melt and thereby smooth the portion(s) 132. Excess powder 156 may overflow the forming chamber 108 as the part exposing mechanism 112 moves the component 114 upwardly within the forming chamber 108. The excess powder 156 may be deposited back into the forming chamber 108.

Figure 6:
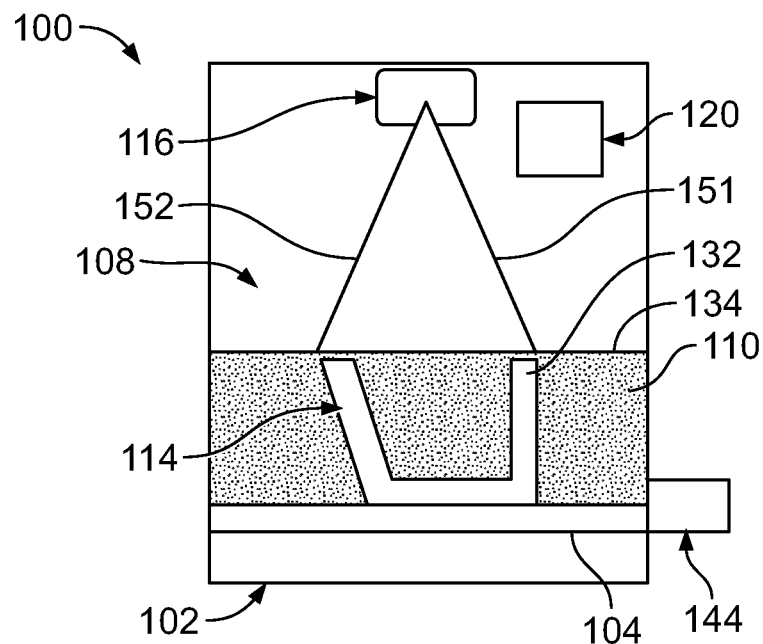
FIG. 6 illustrates a schematic diagram of an additive manufacturing system in a layer forming state, according to an embodiment of the present disclosure.

FIG. 6 illustrates a schematic diagram of the additive manufacturing system 100 in a layer forming state, according to an embodiment of the present disclosure. In the layer forming state, the drain assembly 144 is in a first position, such as a closed position, thereby ensuring that material within the powder bed 110 remains in the forming chamber.

Figure 7:
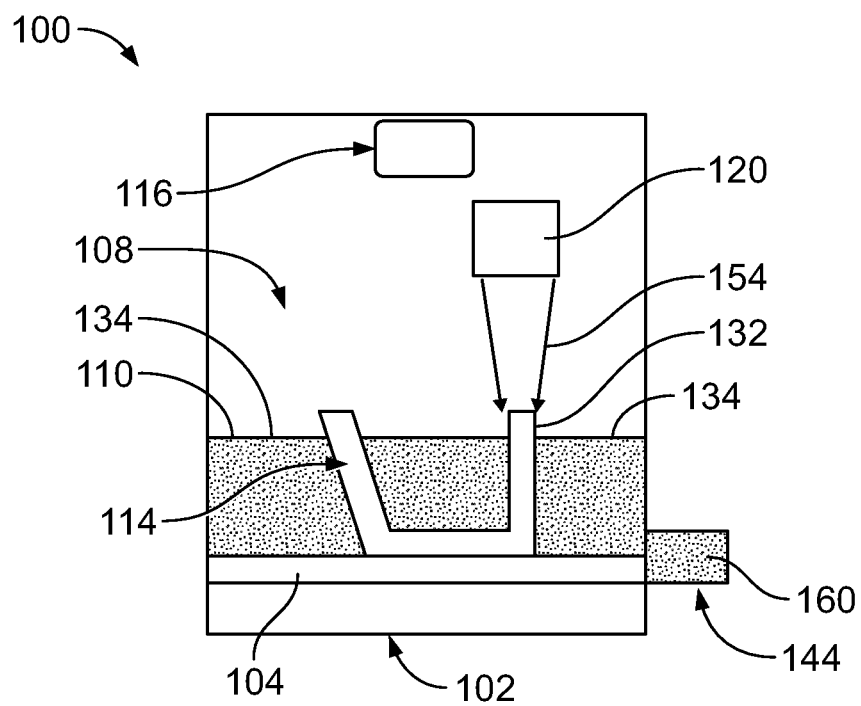
FIG. 7 illustrates a schematic diagram of an additive manufacturing system in a component smoothing state, according to an embodiment of the present disclosure.

FIG. 7 illustrates a schematic diagram of the additive manufacturing system 100 in a component smoothing state, according to an embodiment of the present disclosure. In the component smoothing state, the drain assembly 144 is moved into a second position, such as an open position, thereby allowing an unused portion 160 of the powder bed 110 to drain out of the forming chamber 108. As the unused portion 160 drains out of the forming chamber 108, the portion(s) 132 of the component 114 is exposed above the top surface 134 of the powder bed 110 within the forming chamber 108. The portion(s) 132 may then be smoothed by the surface smoothing head 120, as described herein.

Optionally, the embodiments shown in FIGS. 4-7 may be combined into a single embodiment. For example, the additive manufacturing system 100 may include an actuation system, which may include the actuators 138 shown in FIGS. 4 and 5, and the drain assembly 144 shown in FIGS. 6 and 7.

Figure 8:
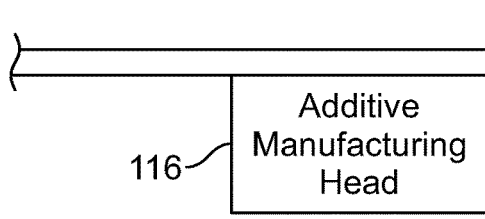
FIG. 8 illustrates a schematic diagram of an additive manufacturing head fixed to a structure, according to an embodiment of the present disclosure.

FIG. 8 illustrates a schematic diagram of the additive manufacturing head 116 fixed to a structure 170, according to an embodiment of the present disclosure. Referring to FIGS. 1 and 8, the additive manufacturing head 116 may be in a fixed position above the powder bed 110. For example, the additive manufacturing head 116 may be securely mounted to the structure 170, such as through fasteners, one or more intermediary structures, adhesives, and/or the like. The structure 170 may be a wall, ceiling, or the like.

Figure 9:
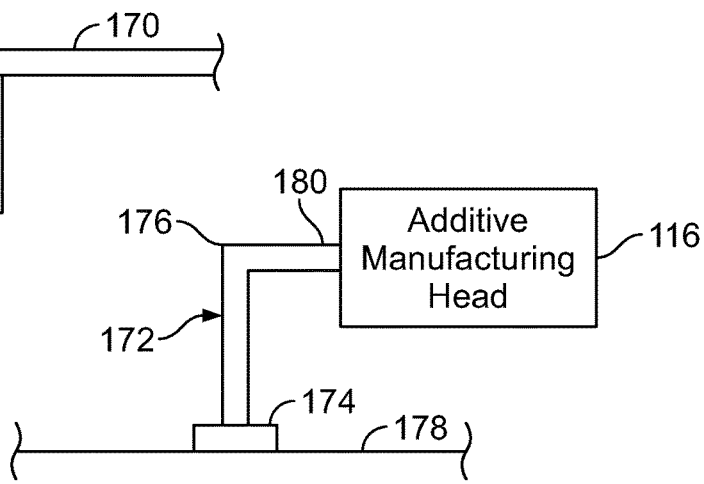
FIG. 9 illustrates a schematic diagram of an additive manufacturing head secured to a mounting assembly, according to an embodiment of the present disclosure.

FIG. 9 illustrates a schematic diagram of the additive manufacturing head 116 secured to a mounting assembly 172, according to an embodiment of the present disclosure. The mounting assembly 172 includes a base 174 and a mounting arm 176 extending therefrom. The base 174 may be supported on a floor 178. The additive manufacturing head 116 is secured to a distal end 180 of the mounting arm 176. The mounting assembly 172 may be configured to fix the additive manufacturing head 116 above the powder bed 110 (shown in FIG. 1). Optionally, the mounting assembly 172 may be configured to moveably position the additive manufacturing head 116.

Figure 10:
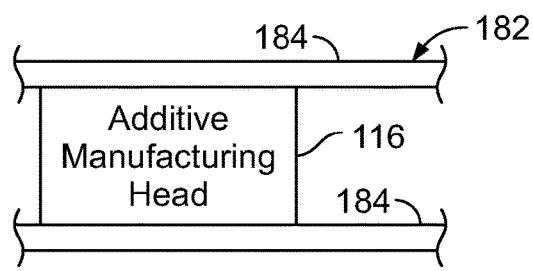
FIG. 10 illustrates a schematic diagram of an additive manufacturing head secured to a track, according to an embodiment of the present disclosure.

FIG. 10 illustrates a schematic diagram of the additive manufacturing head 116 secured to a track 182, according to an embodiment of the present disclosure. The track 182 may be secured to wall, ceiling, floor, and/or the like. The track 182 includes rails 184 that retain a moveable portion of the additive manufacturing head 116. For example, the additive manufacturing head 116 may include rollers retained within the rails 184. In this manner, the additive manufacturing head 116 may be moveable in relation to the powder bed 110 (shown in FIG. 1). The track 182 may include more or less rails than shown. The additive manufacturing head 116 may be moveably coupled to a structure (such as a wall, floor, ceiling, or the like) through other interfaces, such as articulating or telescoping members, wheeled assemblies, and/or the like.

Figure 11:
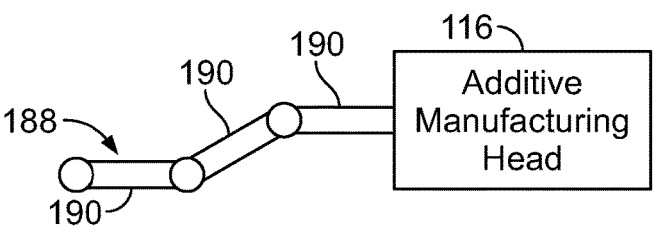
FIG. 11 illustrate a schematic diagram of an additive manufacturing head secured to an articulating arm, according to an embodiment of the present disclosure.

FIG. 11 illustrate a schematic diagram of the additive manufacturing head 116 secured to an articulating arm 188, according to an embodiment of the present disclosure. The articulating arm 188 includes one or more moveable segments 190 that allow the additive manufacturing head 116 to be moved through various degrees of freedom. The articulating arm 188 may include more or less moveable segments 190 than shown.

Figure 12:
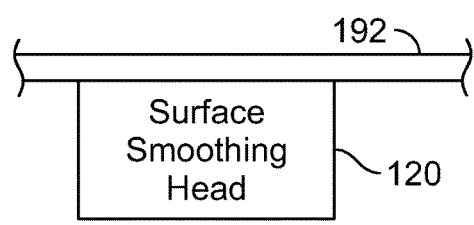
FIG. 12 illustrates a schematic diagram of a surface processing head fixed to a structure, according to an embodiment of the present disclosure.

FIG. 12 illustrates a schematic diagram of the surface smoothing head 120 fixed to a structure 192, according to an embodiment of the present disclosure. Referring to FIGS. 1 and 12, the surface smoothing head 120 may be in a fixed position above the powder bed 110. For example, the surface smoothing head 120 may be securely mounted to the structure 192, such as through fasteners, one or more intermediary structures, adhesives, and/or the like. The structure 192 may be a wall, ceiling, or the like.

Figure 13:
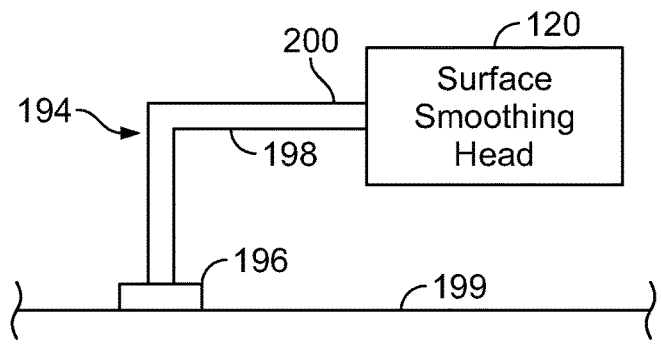
FIG. 13 illustrates a schematic diagram of a surface processing head secured to a mounting assembly, according to an embodiment of the present disclosure.

FIG. 13 illustrates a schematic diagram of the surface smoothing head 120 secured to a mounting assembly 194, according to an embodiment of the present disclosure. The mounting assembly 194 includes a base 196 and a mounting arm 198 extending therefrom. The base 196 may be supported on a floor 199. The surface smoothing head 120 is secured to a distal end 200 of the mounting arm 198. The mounting assembly 194 may be configured to fix the surface smoothing head 120 above the powder bed 110 (shown in FIG. 1). Optionally, the mounting assembly 194 may be configured to moveably position the surface smoothing head 120.

Figure 14:
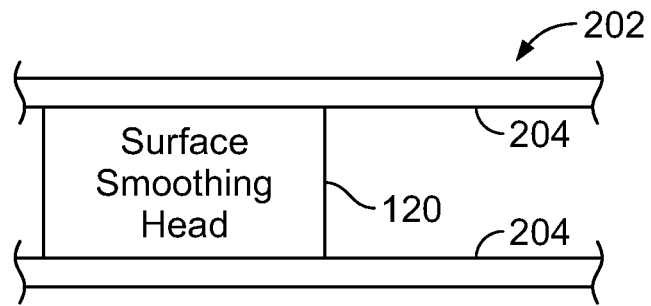
FIG. 14 illustrates a schematic diagram of a surface processing head secured to a track, according to an embodiment of the present disclosure.

FIG. 14 illustrates a schematic diagram of the surface smoothing head 120 secured to a track 202, according to an embodiment of the present disclosure. The track 202 may be secured to wall, ceiling, floor, and/or the like. The track 202 includes rails 204 that retain a moveable portion of the surface smoothing head 120. For example, the surface smoothing head 120 may include rollers retained within the rails 204. In this manner, the surface smoothing head 120 may be moveable in relation to the powder bed 110 (shown in FIG. 1). The track 202 may include more or less rails than shown. The surface smoothing head 120 may be moveably coupled to a structure (such as a wall, floor, ceiling, or the like) through other interfaces, such as articulating or telescoping members, wheeled assemblies, and/or the like.

Figure 15:
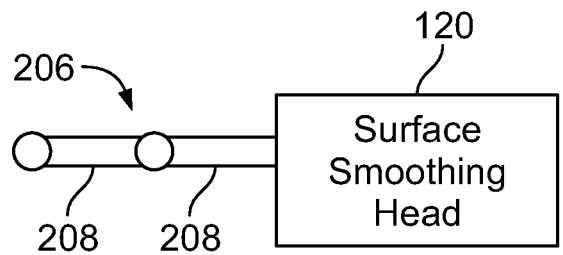
FIG. 15 illustrate a schematic diagram of a surface processing head secured to an articulating arm, according to an embodiment of the present disclosure.

FIG. 15 illustrate a schematic diagram of the surface smoothing head 120 secured to an articulating arm 206, according to an embodiment of the present disclosure. The articulating arm 206 includes one or more moveable segments 208 that allow the surface smoothing head 120 to be moved through various degrees of freedom. The articulating arm 206 may include more or less moveable segments 208 than shown.

Figure 16:
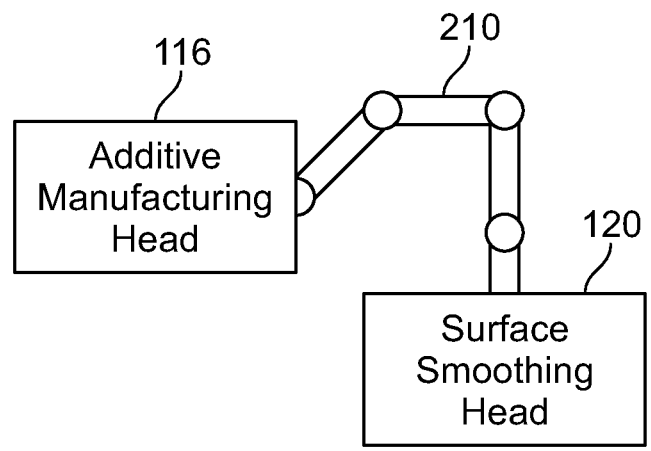
FIG. 16 illustrates a schematic diagram of a surface processing head coupled to an additive manufacturing head, according to an embodiment of the present disclosure.

FIG. 16 illustrates a schematic diagram of the surface smoothing head 120 coupled to the additive manufacturing head 116, according to an embodiment of the present disclosure. A mounting coupling 210 connects the surface smoothing head 120 to the additive manufacturing head 116. For example, the mounting coupling 210 may moveably couple the surface smoothing head 120 to the additive manufacturing head 116, such as through articulating arm segments, a moveable carriage, a track, and/or the like. In at least one other embodiment, the surface smoothing head 120 may be coupled to the additive manufacturing head 116 in a fixed relationship.

Figure 17:
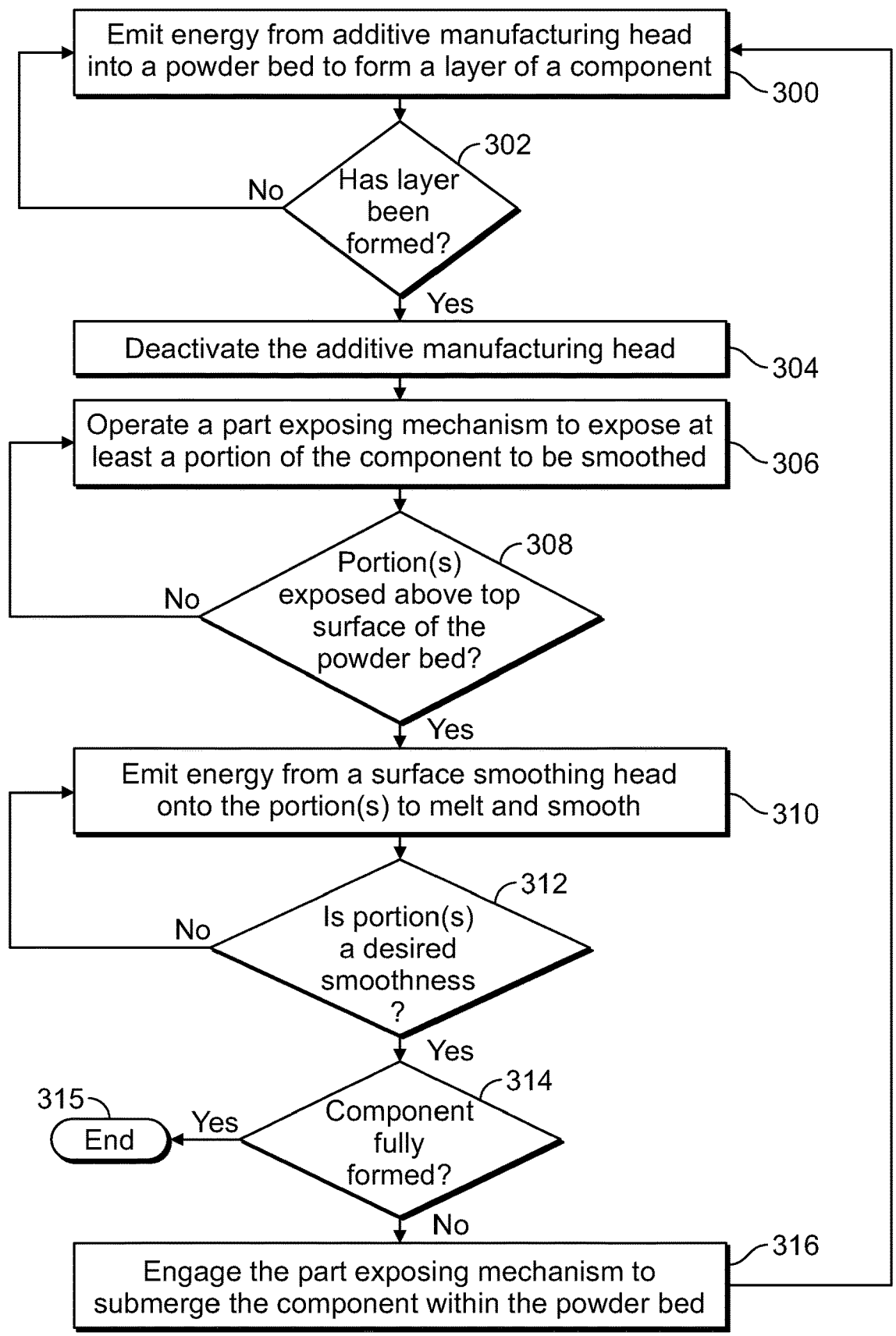
FIG. 17 illustrates a flow chart of an additive manufacturing method, according to an embodiment of the present disclosure.

FIG. 17 illustrates a flow chart of an additive manufacturing method, according to an embodiment of the present disclosure. Referring to FIGS. 1 and 17, the forming control unit 124 may be programmed to operate according to the method shown and described herein.

At 300, energy (such as one or more laser beams) is emitted from the additive manufacturing head 116 into the powder bed 110 to form the layer 128 of the component 114. At 302, it is determined whether the layer 128 has been fully formed. If not, the process returns to 300. The process may continue to loop between 300 and 302 until the layer or layers have been formed to a desired depth, height, or the like. If, however, the layer 128 has been fully formed at 302, the method proceeds to 304, at which the additive manufacturing head 116 is deactivated.

At 306, the part exposing mechanism 112 is operated to expose at least a portion 132 of the component 114 to be smoothed. At 308, it is determined whether the portion(s) 132 is exposed above the top surface 134 of the powder bed 110. If not, the method returns to 306, at which the part exposing mechanism continues to be operated to expose the portion(s) 132.

If, however, the portion(s) 132 is exposed above the top surface 134 of the powder bed 110 at 308, the method proceeds to 310, at which energy (such as a focused laser beam) is emitted from the surface smoothing head 120 onto the portion(s) 132 to melt and smooth the portion(s) 132. At 312, it is determined whether the portion(s) 132 is a desired smoothness. If not, the method returns to 310, at which the energy continues to be emitted from the surface smoothing head 120 onto the portion(s) 132.

If, however, the portion(s) 132 is a desired smoothness at 312, the method proceeds to 314, at which it is determined whether the component 114 is fully formed. If the component 114 is fully formed, the component 114 is removed from the forming chamber 108, and the method ends at 315. If, however, the component 114 is not fully formed at 314, the method proceeds to 316, at which the part exposing mechanism 112 is engaged to submerge the component 114 back within the powder bed 110. The method then returns to 300.

As described herein, certain embodiments of the present disclosure provide an additive manufacturing system that includes a container defining a forming chamber that retains a powder bed (that includes powder), an additive manufacturing head that is configured to emit a first energy into the powder bed to form at least one layer of a component, and a part exposing mechanism on or within the container. The part exposing mechanism is configured to operate so that the component is in a first position at a first time within the powder bed, and a second position at a second time in which a portion of the component is exposed outside of the powder bed. A surface smoothing head is configured to emit a second energy onto the portion of the component in the second position to smooth the portion of the component. A forming control unit is in communication with the additive manufacturing head, the part exposing mechanism, and the surface smoothing head. The forming control unit is configured to control (for example, operate) the additive manufacturing head, the part exposing mechanism, and the surface smoothing head. In at least one embodiment, the surface smoothing head is coupled to the additive manufacturing head.

The part exposing mechanism may include an actuation assembly that is configured to move the component upwardly into the second position so that the portion of the component extends upwardly past a top surface of the powder bed. The actuation assembly may include a forming bed that supports the component, and an actuator operatively coupled to the forming bed.

The part exposing mechanism may include a drain assembly that is configured to be selectively moved between a closed position and an open position. At least a first portion of powder drains through the drain assembly in the open position to expose the portion of the component in the second position. The drain assembly may include a moveable cover proximate to an outlet formed through a container that retains the powder bed. The moveable cover closes the outlet in the closed position, and moves away from the outlet to open the outlet in the open position. At least a first portion of powder drains out of the outlet when the moveable cover is in the open position.

As described herein, embodiments of the present disclosure provide additive manufacturing systems and methods that allow for efficient smoothing of portions of a component. Further, the additive manufacturing systems and methods are configured to expose at least a formed portion of component to be smoothed.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An additive manufacturing system comprising:
a powder bed;
an additive manufacturing head that is configured to emit a first energy into the powder bed to form at least one layer of a component, wherein the additive manufacturing head comprises a first energy emitter configured to emit the first energy as one or more first laser beams or one or more first electron beams;
a part exposing mechanism that is configured to operate so that the component is in a first position at a first time within the powder bed, and a second position at a second time in which a portion of the component is exposed outside of the powder bed, wherein the part exposing mechanism comprises a drain assembly that is configured to be selectively moved between a closed position and an open position, wherein at least a first portion of powder drains through the drain assembly in the open position to expose the portion of the component in the second position, wherein the drain assembly comprises a moveable cover proximate to an outlet formed through a container that retains the powder bed, where in the moveable cover is configured to close the outlet in the closed position, and move away from the outlet to open the outlet in the open position, and wherein at least some of the powder bed drains out of the outlet when the moveable cover is in the open position; and
a surface smoothing head directly coupled to the additive manufacturing head, wherein the surface smoothing head is configured to emit a second energy onto the portion of the component in the second position to smooth the portion of the component, wherein the surface smoothing head comprises a second energy emitter configured to emit the second energy as one or more second laser beams or one or more second electron beams.

2. The additive manufacturing system of claim 1, further comprising a container defining a forming chamber.

3. The additive manufacturing system of claim 2, wherein the part exposing mechanism is on or within the container.

4. The additive manufacturing system of claim 1, wherein the additive manufacturing head is one of fixed in position, or moveable.

5. The additive manufacturing system of claim 1, wherein the surface smoothing head is one of fixed in position or moveable.

6. The additive manufacturing system of claim 1, wherein the first energy and the second energy are the same type of energy, or wherein the first energy is a different type of energy than the second energy.

7. The additive manufacturing system of claim 1, wherein the surface smoothing head is moveably coupled to the additive manufacturing head.

8. The additive manufacturing system of claim 1, further comprising a forming control unit in communication with the additive manufacturing head, the part exposing mechanism, and the surface smoothing head, wherein the forming control unit is configured to operate the additive manufacturing head, the part exposing mechanism, and the surface smoothing head.

9. The additive manufacturing system of claim 1, wherein the part exposing mechanism comprises an actuation assembly that is configured to move the component upwardly into the second position so that the portion of the component extends upwardly past a top surface of the powder bed.

10. The additive manufacturing system of claim 9, wherein the actuation assembly comprises a forming bed that supports the component, and an actuator operatively coupled to the forming bed.

11. The additive manufacturing system of claim 1, wherein the surface smoothing head directly connects to the additive manufacturing head through a mounting coupling.

12. The additive manufacturing system of claim 1, wherein the additive manufacturing head is moveably coupled to the surface smoothing head by an articulating arm.

13. An additive manufacturing method comprising:
   emitting a first energy from an additive manufacturing head into a powder bed to form at least one layer of a component, wherein the emitting the first energy comprises emitting the first energy from a first energy emitter of the additive manufacturing head as one or more first laser beams or one or more first electron beams;
   operating a part exposing mechanism so that the component is in a first position at a first time within the powder bed, and a second position at a second time in which a portion of the component is exposed outside of the powder bed, wherein the operating comprises selectively moving a drain assembly between a closed position and an open position, and wherein at least a first portion of powder of the powder bed drains through the drain assembly in the open position to expose the portion of the component in the second position; and
   emitting a second energy from a surface smoothing head directly coupled to the additive manufacturing head onto the portion of the component in the second position to smooth the portion of the component, wherein the emitting the second energy comprises emitting the second energy from a second energy emitter of the surface smoothing head as one or more second laser beams or one or more second electron beams.

14. The additive manufacturing method of claim 13, wherein the operating comprises using an actuation assembly that moves the component upwardly into the second position so that the portion of the component extends upwardly past a top surface of the powder bed.

15. The additive manufacturing method of claim 13, wherein the operating further comprises supporting the component on a forming bed that is operatively coupled to an actuator.

16. The additive manufacturing method of claim 13, wherein the operating further comprises:
   closing an outlet through a container that retains the powder bed with a moveable cover in the closed position; and
   moving the moveable cover away from the outlet to open the outlet in the open position, wherein at least a first portion of powder drains out of the outlet when the moveable cover is in the open position.

17. The additive manufacturing method of claim 13, wherein the surface smoothing head directly connects to the additive manufacturing head through a mounting coupling.

18. An additive manufacturing system comprising:
   a powder bed;
   an additive manufacturing head that is configured to emit a first energy into the powder bed to form at least one layer of a component, wherein the additive manufacturing head comprises a first energy emitter configured to emit the first energy as one or more first laser beams or one or more first electron beams;
   a part exposing mechanism that is configured to operate so that the component is in a first position at a first time within the powder bed, and a second position at a second time in which a portion of the component is exposed outside of the powder bed; and
   a surface smoothing head directly coupled to the additive manufacturing head, wherein the surface smoothing head is configured to emit a second energy onto the portion of the component in the second position to smooth the portion of the component, wherein the surface smoothing head comprises a second energy emitter configured to emit the second energy as one or more second laser beams or one or more second electron beams,
   wherein the additive manufacturing head is moveably coupled to the surface smoothing head by an articulating arm.

* * * * *